(12) United States Patent
Ohkoshi et al.

(10) Patent No.: US 8,097,180 B2
(45) Date of Patent: *Jan. 17, 2012

(54) MAGNETIC MATERIAL

(75) Inventors: Shin-ichi Ohkoshi, Tokyo (JP);
Kazuhito Hashimoto, Tokyo (JP);
Shunsuke Sakurai, Tokyo (JP); Shiro Kuroki, Tokyo (JP); Kimitaka Sato, Saitama (JP); Shinya Sasaki, Okayama (JP)

(73) Assignees: The University of Tokyo, Tokyo (JP);
DOWA Electronics Materials Co., Ltd., Tokyo (JP)

( * ) Notice: Subject to any disclaimer, the term of this patent is extended or adjusted under 35 U.S.C. 154(b) by 547 days.

This patent is subject to a terminal disclaimer.

(21) Appl. No.: 12/225,166

(22) PCT Filed: Mar. 28, 2007

(86) PCT No.: PCT/JP2007/057509
§ 371 (c)(1),
(2), (4) Date: Sep. 16, 2008

(87) PCT Pub. No.: WO2007/114455
PCT Pub. Date: Oct. 11, 2007

(65) Prior Publication Data
US 2010/0062283 A1 Mar. 11, 2010

(30) Foreign Application Priority Data
Mar. 31, 2006 (JP) .................. 2006-096907

(51) Int. Cl.
*C04B 35/00* (2006.01)
*C04B 35/40* (2006.01)
*H01F 1/00* (2006.01)

(52) U.S. Cl. ................. 252/62.57; 252/62.51 R (58) Field of Classification Search ........... 252/62.51 R, 252/62.53, 62.54, 62.56, 62.58, 62.57; 428/800, 428/812, 820.4, 823, 840.6; 106/31.92
See application file for complete search history.

(56) References Cited

U.S. PATENT DOCUMENTS

| | | | |
|---|---|---|---|
| 6,358,432 B1 * | 3/2002 | Tomono et al. | 252/62.63 |
| 7,781,082 B2 * | 8/2010 | Ohkoshi et al. | 428/836.2 |
| 2003/0049491 A1 * | 3/2003 | Ejiri | 428/694 BH |
| 2010/0171066 A1 * | 7/2010 | Ohkoshi et al. | 252/62.57 |

(Continued)

FOREIGN PATENT DOCUMENTS

DE 2519245 A * 11/1975

(Continued)

OTHER PUBLICATIONS

"Control of Spin Reorientation Phenomenon in e-Fe$_2$O$_3$ Nanomagnet" by Shikutoshi Kuroki et al.; *Digests of the 29th Annual Conference on Magnetics in Japan*; p. 371; Sep. 19-22, 2005.

(Continued)

*Primary Examiner* — Jerry Lorengo
*Assistant Examiner* — Lynne Edmondson
(74) *Attorney, Agent, or Firm* — Clark & Brody (57) ABSTRACT

Disclosed is a magnetic material comprising a crystal of $\epsilon$-Ga$_x$Fe$_{2-x}$O$_3$ (wherein 0<x<1) prepared by substituting a part of Ga$^{3+}$ ion sites of an $\epsilon$-Fe$_2$O$_3$ crystal with Fe$^{3+}$ ions and having X-ray diffraction peaks corresponding to the crystal structure of $\epsilon$-Fe$_2$O$_3$. The coercive force of the magnetic material lowers in accordance with the Ga content thereof, and the saturation magnetization thereof has a maximum value.

8 Claims, 8 Drawing Sheets

U.S. PATENT DOCUMENTS

2010/0238063 A1* 9/2010 Ohkoshi et al. .................. 342/1

FOREIGN PATENT DOCUMENTS

JP      2004134795 A * 4/2004
JP      2005-156390     6/2005

OTHER PUBLICATIONS

"Large Coercive Field and Spin Reorientation Phenomenon in e-$Fe_2O_3$ Nanorod" by S. Sakurai et al.; *Digests of the 29th Annual Conference on Magnetics in Japan*; p. 372; Sep. 19-22, 2005.

"Giant Coercive Field of Nanometer-Sized Iron Oxide" by Jian Jin et al.; *Advanced Materials*; vol. 16, No. 1, Jan. 2004.

"Formation of Spherical and Rod-Shaped e-$Fe_2O_3$ Nanocrystals with a Large Coercive Field" by Jian Jin et al.; *Journal of Materials Chemistry*; vol. 15, pp. 1067-1071; c. 2005.

"Reorientation Phenomenon in a Magnetic Phase of e-$Fe_2O_3$ Nanocrystal" by Shunsuke Sakurai et al.; *Journal of the Physical Science of Japan*; vol. 74, No. 7; Jul. 2005.

* cited by examiner

MAGNETIC MATERIAL

TECHNICAL FIELD

The present invention relates to an $\epsilon$-$Fe_2O_3$-based magnetic material.

PRIOR ART

In the field of magnetic recording, desired is increasing the recording density with an attempt toward noise reduction. Accordingly, for magnetic recording media, it is vital to make them have an as possible large coercive force Hc and to promote magnetic separation with reducing the size of the magnetic particles that constitute the media. Further, it is also considered important that the recording condition could be still kept stable even though the size of the magnetic particles is reduced.

For example, the minimum unit of the magnetic energy ($K_U \times V$) of the cluster of magnetically-bonding magnetic particles constituting a recording bit could be far larger than the thermal energy ($k_B \times T$) acting to disrupt the recording. (Here, $K_U$ is the magnetic anisotropy energy constant, V is the volume of the magnetic cluster, $k_B$ is the Boltzmann's constant, and T is the absolute temperature). The ratio $(K_U \times V)/(k_B \times T)$ is generally used as an index of the ability to stably maintain the recording state, with the aim being to achieve the ratio of at least 60 or more (for recording to last up to 10 years). To advance the development of magnetic recording media capable of having further higher recording densities, the focus more or less has to be on decreasing the magnetic cluster volume V and increasing the magnetic anisotropy energy constant $K_U$. The relationship between $K_U$ and the coercive force Hc is $K_U \propto Hc$, which, in other words, means that the higher the target recording density of a magnetic recording medium is, the greater the Hc of the magnetic material has to be.

A case is reported indicating the reduction in recording magnetization with the lapse of time even though the value of $(K_U \times V)/(k_B \times T)$ is at most 100. This means that, from the viewpoint of noise reduction, an increasing demand for reduction in the magnetic cluster volume V requires a higher magnetic anisotropy constant $K_U$, and an increasing intention to obtain a magnetic recording medium having a higher recording density requires a magnetic material having a higher Hc.

Recently, the existence of $\epsilon$-$Fe_2O_3$ nanoparticles having an extremely large Hc of 20 kOe at room temperature has been confirmed, as in Non-Patent Reference 1, Non-Patent Reference 2, Non-Patent Reference 3 and Non-Patent Reference 4. $\alpha$-$Fe_2O_3$ and $\gamma$-$Fe_2O_3$ are known as the most universal polymorphism having a composition of $Fe_2O_3$ but having a different crystal structure; and $\epsilon$-$Fe_2O_3$ is another morphology thereof. However, as in Non-Patent References 1 to 4, the crystal structure and the magnetic properties of $\epsilon$-$Fe_2O_3$ have been clarified just these days when the synthesis of single-phase $\epsilon$-$Fe_2O_3$ has been succeeded in. This $\epsilon$-$Fe_2O_3$ has an extremely large Hc, and is therefore expected to be applicable to the above-mentioned high-density magnetic recording media.

Non-Patent Reference 1: Jian Jin, Shinichi Ohkoshi and Kazuhito Hashimoto, Advanced Materials 2004, 16, No. 1, January 5, pp. 48-51, Non-Patent Reference 2: Jian Jin, Kazuhito Hashimoto and Shinichi Ohkoshi, Journal of Materials Chimistry 2005, 15, pp. 1067-1071, Non-Patent Reference 3: Shunsuke Sakurai, Jian Jin, Kazuhito Hashimoto and Shinichi Ohkoshi, Journal of the Physical Society of Japan, Vol. 74, No. 7, July, 2005, pp. 1946-1949, Non-Patent Reference 4: Summary of Preprints in the 29th Scientific Lecture by the Applied Magnetic Society of Japan, issued by the Applied Magnetic Society of Japan, Sep. 19, 2005, 21 pPs-17, p. 372.

PROBLEMS THAT THE INVENTION IS TO SOLVE

When a magnetic material already having an extremely high Hc is put to practical use as a recording medium, needed is a magnetic head capable of generating a recording field for actually writing information data on the recording medium. In general, it is said that the magnetic filed to be generated by a magnetic head is proportional to the saturation magnetic flux density of the soft magnetic film used in the head. Currently, hard discs are reported to have an Hc in the order of from 1.5 to 4.5 kOe or so, but the magnetic head to be used for writing on those hard discs comprises a material having a high saturation magnetic flux density of 2.4 T.

As in Non-Patent References 1 to 3, even though $\epsilon$-$Fe_2O_3$ having an extremely large Hc on a level of 20 kOe is used as a magnetic recording material of a magnetic recording medium, it will be in fact impossible to record on the medium in case where a material having a further higher saturation magnetic flux density than currently is unavailable. Specifically, with the magnetic head material on the current level, magnetic recording on the medium is impossible.

One magnetic recording method capable of evading this problem is, for example, heat-assisted magnetic recording. Its concept is as follows: The medium having a large Hc is heated by laser to lower its Hc, and data are written on the medium in that condition, and the thus-written bits are kept stable at room temperature. This is expected as an ultra-high density magnetic recording technique in future. However, this technique is still under basic investigation and its practical use requires further time; and it is not clear as to whether or not the above-mentioned $\epsilon$-$Fe_2O_3$ could be applicable to the heat-assisted magnetic recording.

Non-Patent Reference 4 says that, when a part of $Fe^{3+}$ ions of $\epsilon$-$Fe_2O_3$ are substituted with $In^{3+}$, then the magnetic phase transition temperature (Curie point) and the spin reorientation temperature thereof vary. However, it is unknown how to control the magnetic characteristics, for example, the magnetic hysteresis behavior and the coercive force at room temperature that are necessary in a case of using $\epsilon$-$Fe_2O_3$ for constituting the magnetic layer of a magnetic recording medium.

Accordingly, an object of the present invention is to further improve $\epsilon$-$Fe_2O_3$ described in Non-Patent References 1 to 4 and others thereby obtaining a magnetic material suitable to a magnetic layer of a magnetic recording medium.

MEANS FOR SOLVING THE PROBLEMS

The present inventors have found that, in $\epsilon$-$Fe_2O_3$ described in Non-Patent References 1 to 3, when a part of the $Fe^{3+}$ ion sites are substituted with $Ga^{3+}$ ions, then the coercive force thereof can be controlled not substantially changing the crystal structure, in accordance with the degree of substitution. Specifically, the present invention provides a magnetic material comprising a crystal of $\epsilon$-$Ga_xFe_{2-x}O_3$ (wherein $0<x<1$) prepared by substituting a part of $Fe^{3+}$ ion sites of an ε-Fe$_2$O$_3$ crystal with Ga$^{3+}$ ions and having X-ray diffraction peaks corresponding to the crystal structure of ε-Fe$_2$O$_3$.

The coercive force of the Ga-containing ε-Fe$_2$O$_3$ lowers depending on the value of x. The Ga-containing ε-Fe$_2$O$_3$ according to the invention is fine particles preferably having a mean particle volume of at most 20000 nm$^3$ as measured on the TEM image thereof; and more preferably, it may constitute a magnetic layer of fine particles having a single domain structure. Accordingly, the magnetic material is applicable to a material to constitute the magnetic layer of a magnetic recording medium. Specifically, according to the invention, there is provided a magnetic layer of a magnetic recording medium, which comprises a powder of the above-mentioned, Ga-containing ε-Fe$_2$O$_3$ fine crystal particles having a mean particle volume of at most 20000 nm$^3$ as measured on the TEM image thereof and in which the magnetization easy axis of each particle crystal is oriented in a predetermined direction and the position of the individual particles is fixed. The Ga-containing ε-Fe$_2$O$_3$ powder that constitutes the magnetic layer has a coercive force of from 1000 to 10000 (Oe). The particle surface of the powder may be coated with a thin film of a non-magnetic compound.

PREFERRED EMBODIMENTS OF THE INVENTION

As described in Non-Patent References 1 to 3, a single phase of ε-Fe$_2$O$_3$ nanoparticles can be obtained through a combination of a reverse micelle method and a sol-gel method and heat treatment. The reverse micelle method essentially comprises mixing two types of a micelle solution I (starting material micelle) and a micelle solution II (neutralizer micelle) both containing a surfactant, thereby attaining precipitation of iron hydroxide in the micelle. The sol-gel method essentially comprises forming a silica coat on the surface of the iron oxide fine particles formed in the micelle. The silica-coated iron oxide fine particles are separated from the liquid, and then heat-treated in an air atmosphere at a predetermined temperature (within a range of from 700 to 1300° C.). As a result of the heat treatment, fine particles of single-phase ε-Fe$_2$O$_3$ are obtained. More concretely, this is as follows:

Typically, iron (III) nitrate and a surfactant (for example, cetyltrimethylammonium bromide) are dissolved in the aqueous phase of the micelle solution I having n-octane as its oily phase, and an aqueous ammonia solution is used as the aqueous phase of the micelle solution II also having n-octane as its oily phase. In this stage, preferably, a suitable amount of an alkaline earth metal (Ba, Sr, Ca, etc.) nitrate is dissolved in the aqueous phase of the micelle solution I as a morphology controlling agent. The presence of the morphology controlling agent gives finally rod-shaped ε-Fe$_2$O$_3$ single-phase crystals. After the two micelle solutions I and II are combined, this is then processed according to the sol-gel method. Specifically, while a silane (e.g., tetraethyl-orthosilane) is dropwise added thereto, the combined liquid is kept stirred whereby iron oxide is formed in the micelle. Accordingly, the surface of the fine particles of the iron oxide precipitate formed in the micelle may be coated with the silica formed by hydrolysis of the silane. Next, the silica-coated iron oxide particles are separated from the liquid, washed and dried, and the resulting particulate powder is charged into a furnace, and heat-treated (baked) in air therein at a temperature falling within a range of from 700 to 1300° C., preferably from 900 to 1200° C., more preferably from 950 to 1100° C. Thus heat-treated, the iron oxide particles are oxidized in the silica coating thereof to give fine ε-Fe$_2$O$_3$ particles. During the oxidation, the silica coating contributes toward the formation of single-phase ε-Fe$_2$O$_3$ but not α-Fe$_2$O$_3$ or γ-Fe$_2$O$_3$, and acts to prevent the particles from being sintered together. Further, the presence of a suitable amount of an alkaline earth metal facilitates the growth of rod-shaped ε-Fe$_2$O$_3$ single-phase particles.

As described in the Examples to be given hereinunder, the present inventors have found that, in the ε-Fe$_2$O$_3$ production method mentioned in the above, when a part of iron(III) nitrate to be dissolved in the aqueous phase of the micelle solution I is substituted with gallium(III) nitrate and the system is processed according to the similar combination of the reverse micelle method and the sol-gel method and heat treatment, then a Ga-containing ε-Fe$_2$O$_3$ single phase having the same crystal structure as that of ε-Fe$_2$O$_3$ can be produced, and that its coercive force varies depending on the degree of Ga substitution therein.

Figure 1:
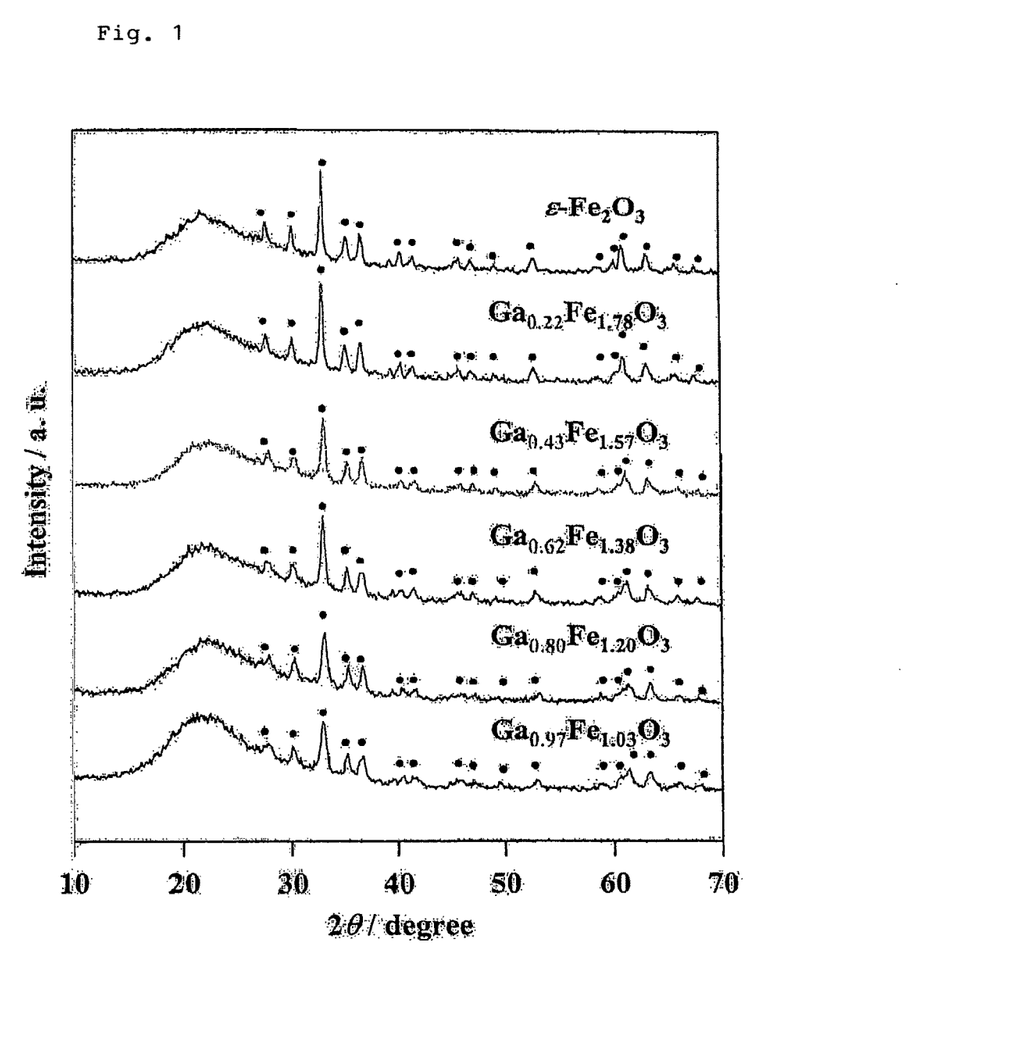
FIG. 1 shows the XRD pattern of Ga-containing ε-Fe$_2$O$_3$ crystals according to the invention, as compared with that of ε-Fe$_2$O$_3$.

FIG. 1 shows the XRD pattern of samples of Ga-containing ε-Fe$_2$O$_3$ crystals produced according to the above-mentioned method (the heat treatment condition for baking was 1000° C.×4 hours), in which the value x in ε-Ga$_x$Fe$_{2-x}$O$_3$ is 0.22, 0.43, 0.62, 0.80 and 0.97, as compared with that of ε-Fe$_2$O$_3$ (x=0). As in FIG. 1, all the Ga-containing ε-Fe$_2$O$_3$ gave only the peaks corresponding to the crystal structure of ε-Fe$_2$O$_3$ (orthorhombic, space group Pna2$_1$).

Figure 2:
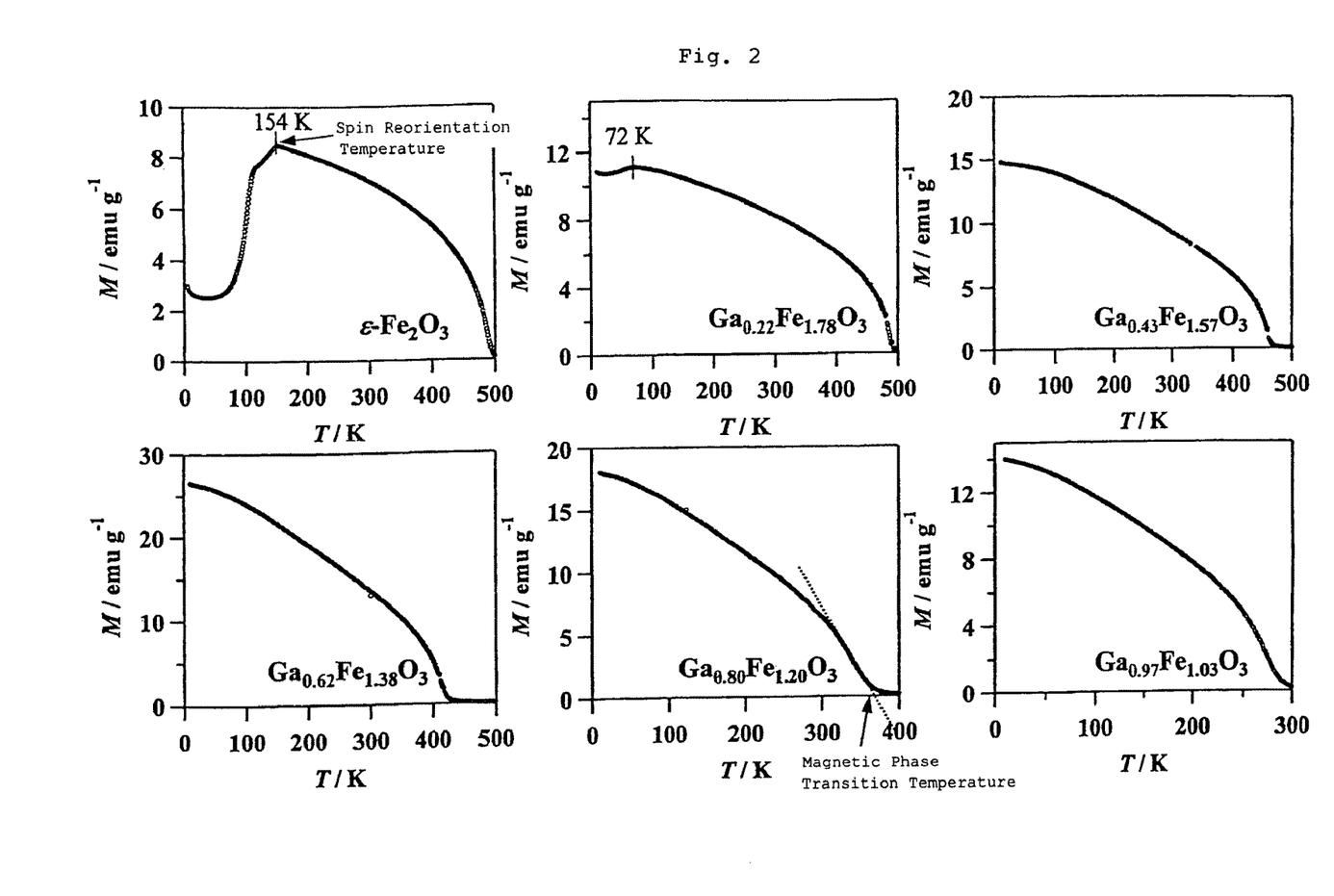
FIG. 2 shows the magnetization curve of different samples of Ga-containing ε-Fe$_2$O$_3$ particulate powders according to the invention, measured in an external magnetic field of 1000 Oe at different temperatures, as compared with that of ε-Fe$_2$O$_3$.

FIG. 2 shows the magnetization curve of the same samples as in FIG. 1, measured in an external magnetic field of 1000 Oe at different temperatures. For the measurement, used was a superconducting quantum interference device (SQUID). In this case, the sample was once heated up to not lower than the magnetic phase transition temperature thereof at a heating speed of 2 K/min, and then its magnetization was measured while cooled at a cooling speed of 2 K/min. The magnetization curve of the Ga-containing $\epsilon$-Fe$_2$O$_3$ differs from that of In-containing $\epsilon$-Fe$_2$O$_3$ described in Non-Patent Reference 4, in point of the spin reorientation behavior. Specifically, $\epsilon$-In$_{0.12}$Fe$_{1.88}$O$_3$ and $\epsilon$-In$_{0.18}$Fe$_{1.82}$O$_3$ in Non-Patent Reference 4 had a spin reorientation temperature of 170K and 192K, respectively, and was higher than 154K of $\epsilon$-Fe$_2$O$_3$ depending on the degree of In substitution therein, and the magnetization change before and after the spin reorientation temperature was steeper. As seen from the results in FIG. 2, Ga-containing $\epsilon$-Fe$_2$O$_3$ had no spin reorientation temperature elevation with the increase in the degree of Ga substitution, within the range of the degree of Ga substitution shown therein, but rather they had no spin reorientation at the lower temperature side and still kept high magnetization even at low temperatures.

Regarding the magnetic phase transition temperature, there is seen a great difference between the two. The magnetic phase transition temperature of the In-substituted $\epsilon$-In$_x$Fe$_{2-x}$O$_3$ in which x is 0.18, or that is, $\epsilon$-In$_{0.18}$Fe$_{1.82}$O$_3$ in Non-Patent Reference 4 was lower by about 70K than the magnetic phase transition temperature, 495K of $\epsilon$-Fe$_2$O$_3$; whereas the magnetic phase transition temperature of the Ga-substituted one having nearly the same degree of substitution, or that is, $\epsilon$-Ga$_{0.22}$Fe$_{1.78}$O$_3$ did not almost differ from the magnetic phase transition temperature, 495K of $\epsilon$-Fe$_2$O$_3$, as in FIG. 2 (strictly, the former was lower by about 5K than the latter).

Further, the In-substituted one with x=0.3 or so could not form a uniform solid solution, but the Ga-substituted one with x=1.0 could form a uniform solid solution; and in this point, it is found that the Ga substitution and the In substitution show different behavior.

Figure 3:
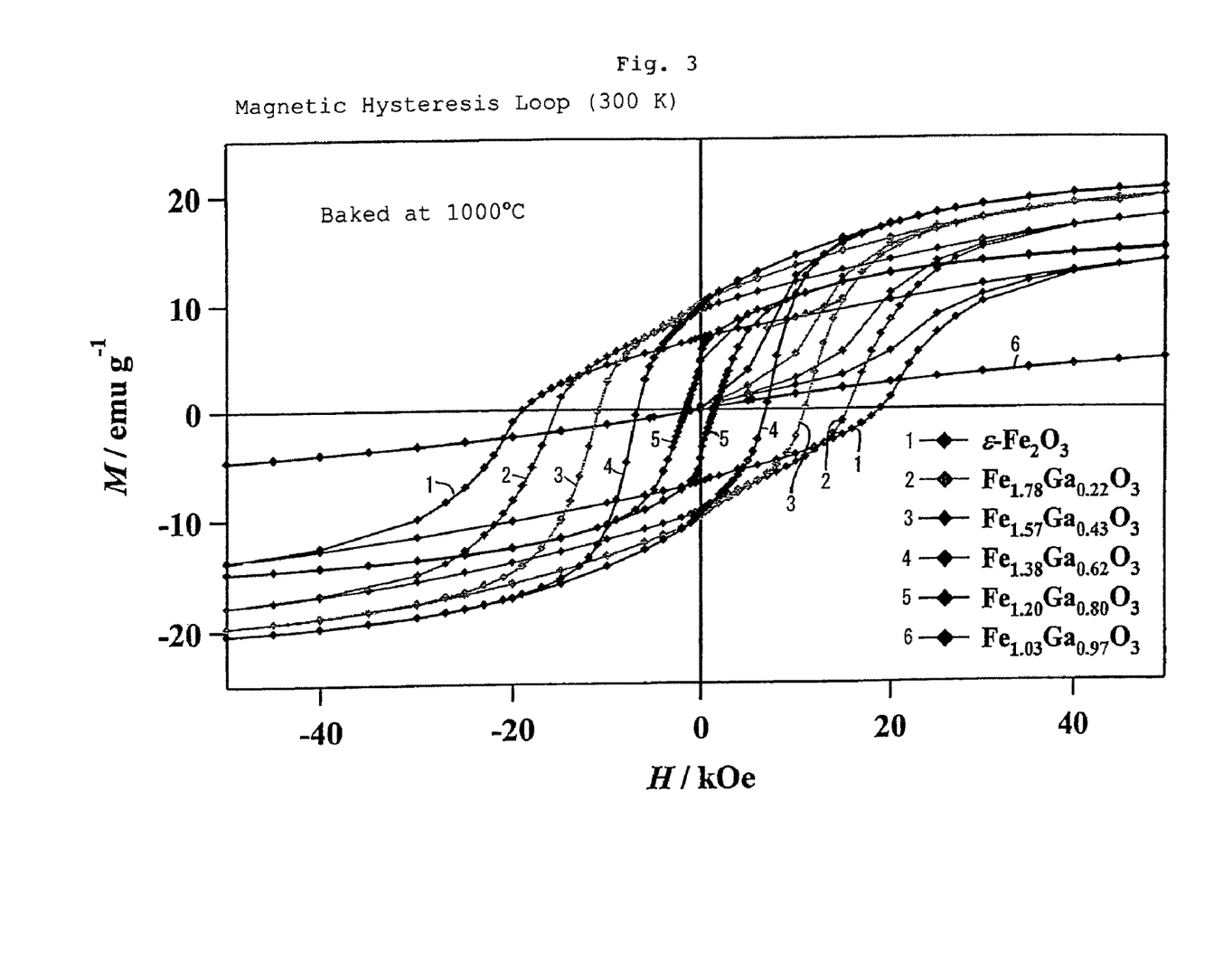
FIG. 3 shows the magnetic hysteresis loop of Ga-containing ε-Fe$_2$O$_3$ samples according to the invention, as compared with that of ε-Fe$_2$O$_3$.

FIG. 3 shows the magnetic hysteresis loop of the same samples as in FIG. 1, as measured at room temperature (300K) as compared with that of $\epsilon$-Fe$_2$O$_3$. For the measurement, used was a superconducting quantum interference device (SQUID), Quantum Design's MPMS7, under a magnetic field application condition of 50 kOe. The found magnetic moment data were standardized by the mass of iron oxide. In this case, it was presumed that the elements of Si, Fe and M (M is the element added as the morphology controlling agent) could exist all as SiO$_2$, Fe$_2$O$_3$ and MO, respectively; and the content ratio of the elements was determined through fluorescent X-ray analysis. As understood from the results in FIG. 3, it is apparent that the magnetic hysteresis loop of $\epsilon$-Fe$_2$O$_3$ having an extremely large coercive force on a level of 20 kOe smoothly changes to that of $\epsilon$-Ga$_{0.97}$Fe$_{1.03}$O$_3$ in which x is nearly 1 and which has almost 0 Oe, with the increase in Ga therein.

Figure 4:
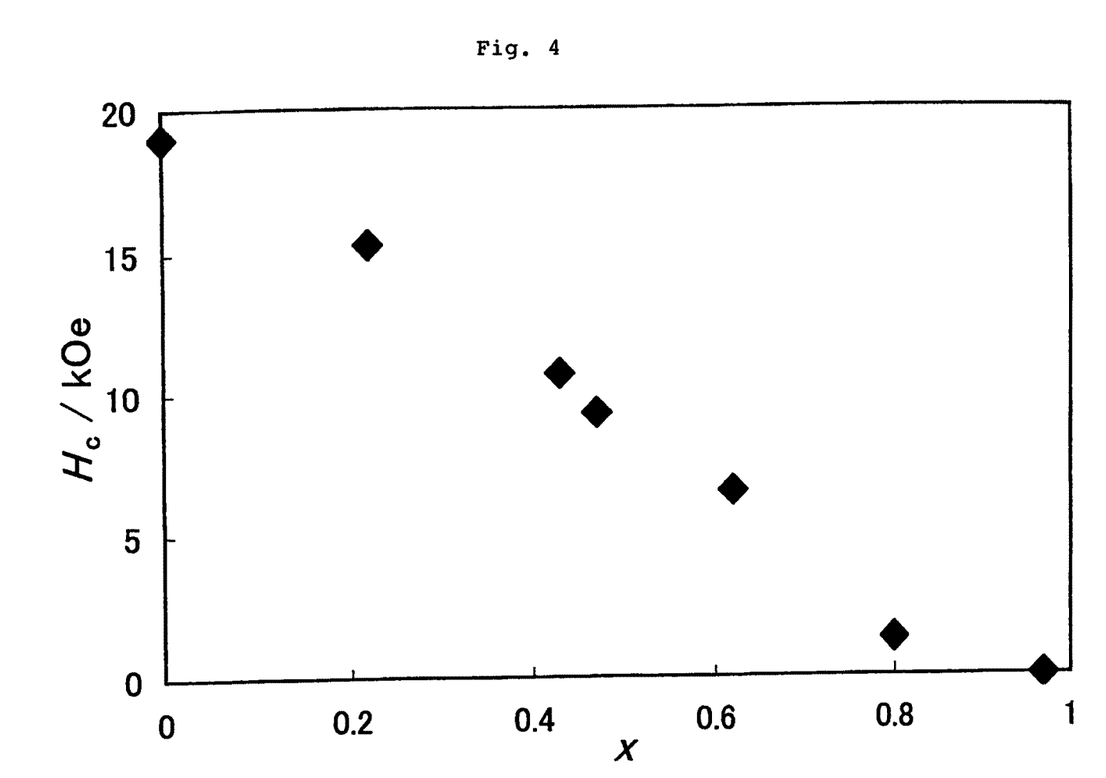
FIG. 4 shows the coercive force of Ga-containing ε-Fe$_2$O$_3$ particulate powders according to the invention, as arranged on the basis of the degree of Ga substitution (x value).
Figure 5:
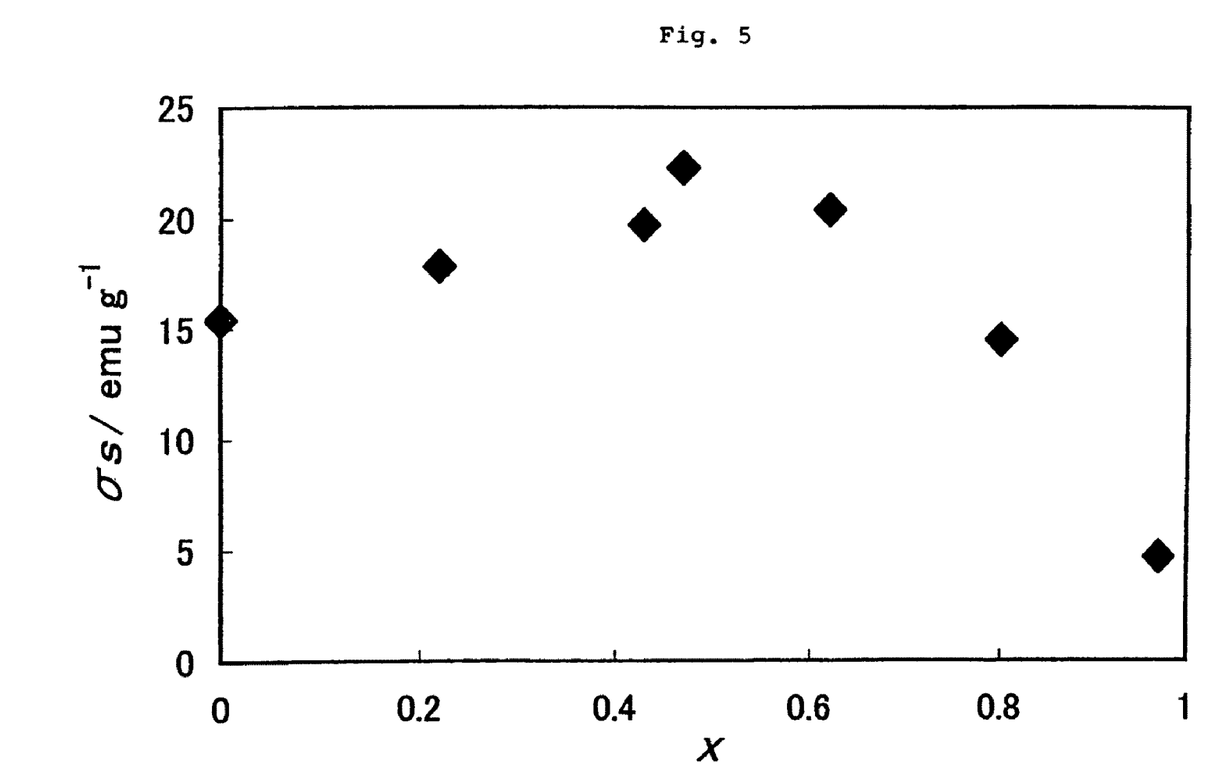
FIG. 5 shows the saturation magnetization of Ga-containing ε-Fe$_2$O$_3$ particulate powders according to the invention, as arranged on the basis of the degree of Ga substitution (x value).

FIG. 4 shows the coercive force of the samples in FIG. 3, as arranged on the basis of the value x. It is apparent that the coercive force uniformly lowers with the increase in the value x up to around 1. FIG. 5 shows the saturation magnetization ($\sigma_s$) of the samples in FIG. 3, as arranged on the basis of the value x. As seen from the results in FIG. 5, the saturation magnetization increases with the increase in the value x up to around 0.5, but when the value x increases more, the saturation magnetization lowers. Specifically, with the increase in the degree of Ga substitution, the saturation magnetization changes to have a maximum value.

Figure 9:
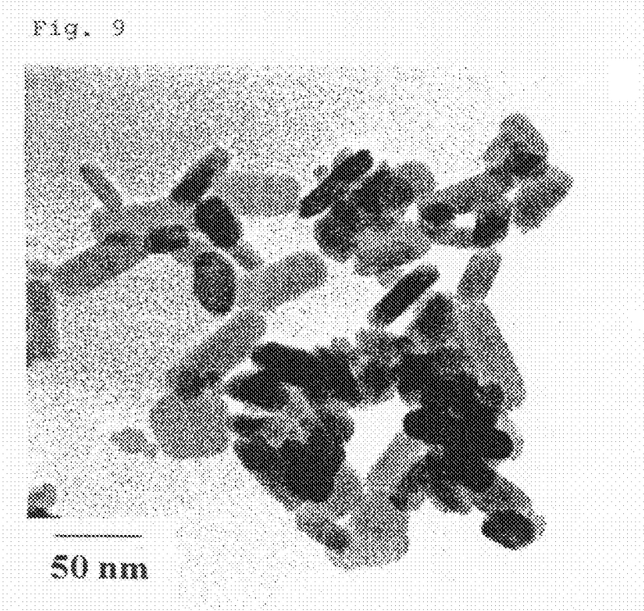
FIG. 9 is a TEM image of the Ga-containing ε-Fe$_2$O$_3$ particulate powder according to the invention, obtained in Example 4.
Figure 10:
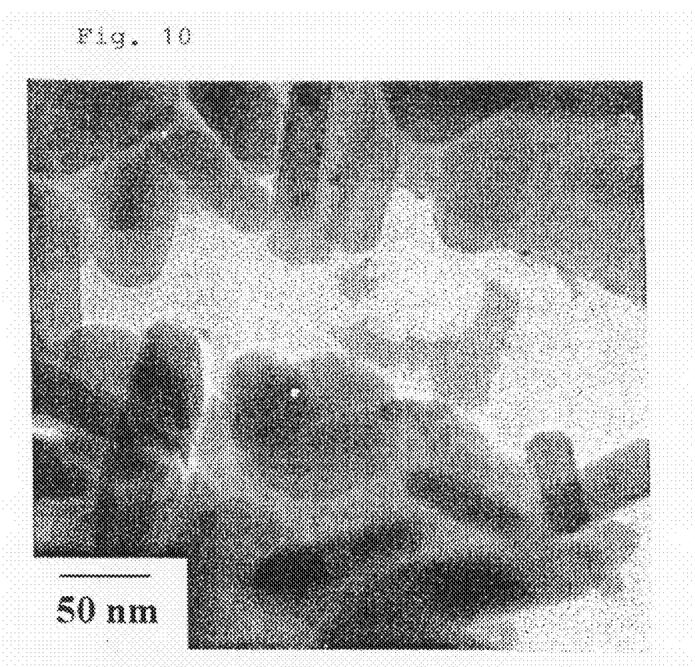
FIG. 10 is a TEM image of the Ga-containing ε-Fe$_2$O$_3$ particulate powder according to the invention, obtained in Example 5.
Figure 11:
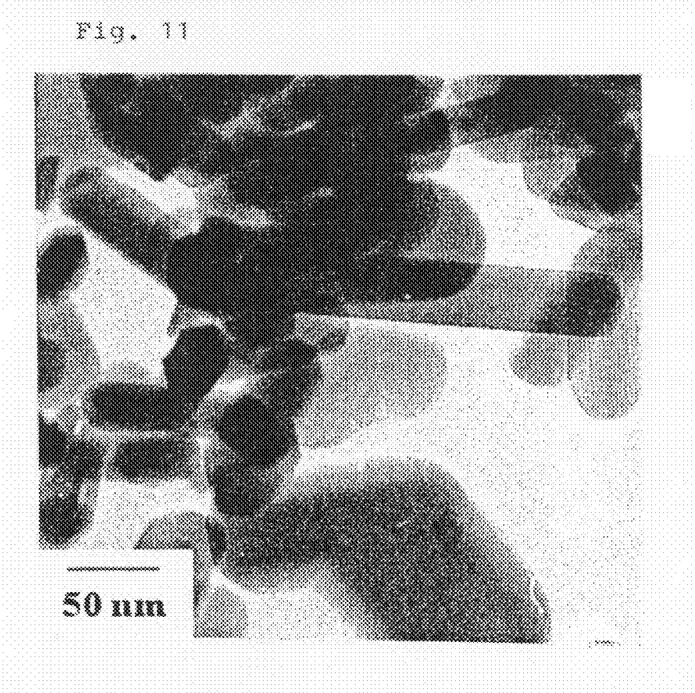
FIG. 11 is a TEM image of ε-Fe$_2$O$_3$ crystal particles.

FIG. 6 to FIG. 10 are TEM images of the Ga-containing $\epsilon$-Fe$_2$O$_3$ particulate powders obtained in Examples 1 to 5 given hereinunder; and FIG. 11 is a TEM image of $\epsilon$-Fe$_2$O$_3$ obtained in Control Example given hereinunder. It is shown that all those samples comprise flat surface-having rod-shaped fine particles that are like to be single crystals.

The particulate powder of Ga-containing $\epsilon$-Fe$_2$O$_3$ crystals having the above magnetic properties has a high coercive force at room temperature and is a fine powder, and is therefore suitable for a magnetic material for high-density magnetic recording. In particular, the coercive force of the crystal may be controlled to a desired level depending on the degree of Ga substitution (the value x), and as the case may be, the saturation magnetization of the crystal may be increased more than that of $\epsilon$-Fe$_2$O$_3$ by employing a suitable degree of Ga substitution; and therefore, a magnetic layer capable of satisfying the magnetic properties necessary for magnetic recording media can be constituted.

The magnetic material according to the invention comprises a Ga-containing $\epsilon$-Fe$_2$O$_3$ crystal represented by a general formula, $\epsilon$-Ga$_x$Fe$_{2-x}$O$_3$, in which a part of the Fe$^{3+}$ ion sites in an $\epsilon$-Fe$_2$O$_3$ crystal are substituted with Ga$^{3+}$ ions, as so mentioned in the above. In this, the value x is preferably within a range of 0<x<1; and as so mentioned in the above, when the value x is selected within the range, then a material having a coercive force (Hc) suitable to magnetic recording can be obtained. In case where x is 0, Hc is at most 20 kOe or so and is high; and when this material is applied to magnetic recording, then a magnetic head applicable to recording magnetization writing is hardly available at present. On the other hand, when x is more than 1, then Hc is about 0 Oe, and the material is unsuitable to magnetic recording since the recording could not be stably kept as such at room temperature.

Ideally, the magnetic material of the invention comprises a composition represented by a general formula $\epsilon$-Ga$_x$Fe$_{2-x}$O$_3$ (0<x<1), but may contain any other component or compound such as impurities in its production.

In case where the Ga-containing $\epsilon$-Fe$_2$O$_3$ crystal according to the invention is produced according to a combination of the reverse micelle method and the sol-gel method, the presence of a suitable amount of an alkaline earth metal ion in the micelle facilitates the formation of finally rod-shaped crystals. The alkaline earth metal (Ba, Sr, Ca, etc.) added as a morphology controlling agent may remain in the surface layer part of the formed crystal; and therefore, the magnetic material of the invention may contain the morphology controlling agent. For these reasons, the magnetic material of the invention may contain, in addition to the composition represented by a general formula $\epsilon$-Ga$_x$Fe$_{2-x}$O$_3$, at least one alkaline earth metal element (hereinafter the alkaline earth metal element is represented by M). The remaining content is up to at most M/(Fe+Ga)=20% by mass. The alkaline earth metal content over 20% by mass is generally unnecessary for attaining the function as the morphology controlling agent; and preferably, the content is at most 10% by mass.

Further, the silica coat formed on the surface of the iron oxide fine particles in the sol-gel method may remain still on the surface of the heat-treated, Ga-containing $\epsilon$-Fe$_2$O$_3$ crystal particles. When the surface of the Ga-containing $\epsilon$-Fe$_2$O$_3$ crystal particles is coated with a thin film of a non-magnetic compound such as silica, then the particulate powder has some advantages in point of improvement of durability, weather resistance and reliability for the reasons mentioned below, from the viewpoint of the handlability of the particulate particle and in case where the particulate powder is used for magnetic materials of various applications.

The Ga-containing $\epsilon$-Fe$_2$O$_3$ particle is an oxide, and therefore, when compared with metallic magnetic particles, it has high oxidation resistance; however, since the Fe element itself is an element readily undergoing chemical reaction, it is difficult to completely protect the element from complex formation and reaction with acid. When a magnetic tape is used for a long period of time or under a high-temperature high-humidity condition, then the magnetic particles may react with the resin or the dispersant in the tape to give a metal complex. When the formed metal complex adheres to and reacts with the surface of a magnetic head, then the spacing between the tape and the head may broaden to thereby lower the recording signal intensity, and in the worst case, the recording could not be read out. The gaseous component such as $H_2S$, $Cl_2$ and $NO_2$ in air may react with water, and the resulting acidic corrosive gas may corrode the magnetic particles. However, when the surface of the Ga-containing $\epsilon$-$Fe_2O_3$ particles is coated with a thin film of a chemically-stable non-magnetic compound such as silica, then the particles are significantly resistant to complex formation and acid, and therefore, may constitute a magnetic material excellent in durability, weather resistance and reliability.

Accordingly, the magnetic material of the invention may contain, in addition to the Ga-containing $\epsilon$-$Fe_2O_3$ composition represented by a general formula $\epsilon$-$Ga_xFe_{2-x}O_3$, silica in an amount of at most Si/(Fe+Ga)=100% by mass. Silica more than 100% by mass is unfavorable as causing significant aggregation of particles. Specifically, according to the invention, there is provided a magnetic material excellent in durability, weather resistance and reliability, which comprises a particulate powder represented by a general formula $\epsilon$-$Ga_xFe_{2-x}O_3$ (0<x<1) and coated with a thin film of a non-magnetic compound such as silica. The non-magnetic compound to form the thin film may be a heat-resistant compound such as alumina or zirconia, in addition to silica.

The magnetic material of the invention may be used as a mixed powder of Ga-containing $\epsilon$-$Fe_2O_3$ particles and $\epsilon$-$Fe_2O_3$ particles added thereto, depending on its use.

The mean particle volume of the Ga-containing $\epsilon$-$Fe_2O_3$ particles of the invention, as measured on the TEM image thereof, is preferably at most 20000 $nm^3$, more preferably at most 15000 $nm^3$, even more preferably at most 10000 $nm^3$, still more preferably at most 5000 $nm^3$.

The mean particle volume may be measured on the TEM image as follows: 300 particles are randomly selected from the 600,000-power TEM (transmission electronic microscope) image, and their mean diameter is determined. Their shapes are checked up, and those having an aspect ratio (major axis/minor axis) of at least 1.5 are approximated to columnar forms and their volume is computed. Those having an aspect ratio of less than 1.5 are approximated to spherical forms, and their volume is computed based on the major axis diameter. In the approximated columnar form, the minor axis is the diameter of the circle, and the major axis is the height of the column. In the data backup magnetic recording tapes that are commercially available at present, the TEM-based mean particle volume of most magnetic particles is at least 20000 $nm^3$, and magnetic particles finer than these are desired. The magnetic material of the invention can satisfy this requirement. In case where the magnetic material of the invention is used for constituting a magnetic layer for magnetic recording, the individual particles are so fine that could have a single domain structure, and therefore a magnetic layer having a high magnetic recording density can be constituted.

For constituting the magnetic layer of a coating type magnetic recording medium, by the use of the Ga-containing $\epsilon$-$Fe_2O_3$ particles of the invention, the corresponding particulate powder having a mean particle volume of at most 20000 $nm^3$ as measured on the TEM image thereof may be fixed on a support while the magnetization easy axis of each particle crystal is oriented in a predetermined direction and the position of each particle is fixed on the support. Specifically, a magnetic powder comprising a crystal of $\epsilon$-$Ga_xFe_{2-x}O_3$ (0<x<1) prepared by substituting a part of $Fe^{3+}$ ion sites of an $\epsilon$-$Fe_2O_3$ crystal with $Ga^{3+}$ ions and having X-ray diffraction peaks corresponding to the crystal structure of $\epsilon$-$Fe_2O_3$ is fixed on a support while the magnetization easy axis of each particle crystal is oriented in a predetermined direction and the position of each particle is fixed on the support, whereby a magnetic layer of a magnetic recording medium suitable to high density recording may be obtained.

On the other hand, a magnetic layer suitable to heat-assisted magnetic recording or next-generation photomagnetic recording may also be obtained. In heat-assisted magnetic recording, a medium having a large Hc is heated by laser to lower its Hc and data are thereby recorded on it, and the written bits are kept stable as such at room temperature. This is the concept of heat-assisted magnetic recording, and this is expected as an ultra-high density magnetic recording technique in future. On the other hand, a photomagnetic disc is as follows: A laser is applied to a medium, and data are written on it owing to the local temperature elevation to give Hc reduction and magnetic field; and the written data are read out based on the phenomenon to produce a difference in the rotation angle of the polarization plane of incident light depending on the magnetization direction, or that is, this is a magnetic recording system that utilizes a magnetic optical effect. In the heat-assisted recording and the photomagnetic recording expected for the ultra-high density recording, the recording medium receives repeated cycles of heating and cooling, and therefore, its magnetic material is required to have chemical stability to oxidative corrosion, and heat stability to crystal transformation, crystallization or the like, and to have properties of a suitable light absorption coefficient and reflectivity. A magnetic material comprising $\epsilon$-$Fe_2O_3$ or Ga-containing $\epsilon$-$Fe_2O_3$ fully satisfies the requirements as the ingredient is an oxide. Further, the magnetic material of the invention has a high coercive force, and in addition, its coercive force and the degree of saturation magnetization thereof can be controlled by the degree of Ga substitution therein, as so mentioned in the above; and therefore it can be a material suitable to these.

In particular, in heat-assisted recording applied to hard discs, there are problems of head disc interface and head temperature elevation. In addition, there may be other problems in that the spacing between the magnetic head and the disc is only at most a few tens nm and that a lubricant is applied to the disc for preventing disc-to-head abrasion. In particular, the lubricant is an organic substance and therefore it is assumed that the durability to high temperature may greatly lower even within a short period of time. As the lubricant, generally used is a fluorine-containing liquid lubricant. Though the fluorine-containing liquid lubricant has relatively high heat resistance among organic substances, 300° C. (573K, as K=273° C.) is the limitation of the heat resistance thereof. When repeated heating is taken into consideration, and even though the heating time in one operation is within a short period of time, the heating will be desirably at a temperature not higher than 200° C. (473K). The highest heating temperature is correlated with the magnetic phase transition temperature of the recording medium, and therefore, from the viewpoint of head disc interface, it may be said that the magnetic phase transition temperature of the medium is preferably lower. The magnetic material of the invention satisfies this requirement.

As in the above, the magnetic material of the invention is useful for application to high-density magnetic recording media, and in addition, because of the stability of the oxide substance and of the excellent magnetic properties thereof, the magnetic material can also be used for electric wave absorbents, nano-scale electronic materials, permanent magnet materials, biomolecular markers, drug carriers, etc.

As described in the above, an example of producing Ga-containing $\epsilon$-$Fe_2O_3$ particles of the invention is disclosed, which comprises a reverse micelle method of preparing ultrafine particles of iron hydroxide and gallium hydroxide to be the precursors thereof; however, the precursor preparation is not limited to the reverse micelle method, for which is employable any other method capable of preparing the same precursors having a size of at most a few hundred nm. Also, an example of coating the precursor ultrafine particles with silica according to a sol-gel method is disclosed; however, the film formation is not limited to the sol-gel method, for which is employable any other method capable of coating the precursor with a heat-resistant coating film of silica or the like. For example, in case where a heat-resistant coating film of alumina, zirconia or the like is formed on the surface of the precursor ultrafine particles, Ga-containing $\epsilon$-$Fe_2O_3$ particles may also be formed when the coated particles are heated at a predetermined heat treatment temperature.

EXAMPLES

Example 1

This is an example of producing $\epsilon$-$Ga_{0.22}Fe_{1.78}O_3$.

[Step 1]

Two micelle solutions, micelle solution I and micelle solution II are prepared.

Preparation of Micelle Solution I:

6 mL of pure water, 18.3 mL of n-octane and 3.6 mL of 1-butanol were put into a Teflon™ flask, to which were added 0.0180 mol/L of iron(III) nitrate 9-hydrate and 0.0020 mol/L of gallium(III) nitrate n-hydrate (n=7 to 9, produced by Wako Pure Chemical Industries, having a purity of 99.9%; before its use, it was quantitatively analyzed to identify n, and then its amount to be fed was computed). The material composition fed to the flask was $\epsilon$-$Ga_{0.20}Fe_{1.80}O_3$. Further, as a morphology controlling agent, 0.002 mol/L of barium nitrate was added, and dissolved with well stirring at room temperature. Further, as a surfactant, cetyltrimethylammonium bromide was added in an amount to give a molar ratio, pure water/surfactant of 30, and dissolved with stirring thereby to prepare a micelle solution I.

Preparation of Micelle Solution II:

2 mL of 25% aqueous ammonia was mixed with 4 mL of pure water and stirred, and to the liquid, further added were 18.3 mL of n-octane and 3.6 mL of 1-butanol and well stirred. To the solution, added was cetyltrimethylammonium bromide as a surfactant in an amount to give a molar ratio, (pure water+water in ammonia)/surfactant of 30, and dissolved to prepare a micelle solution II.

[Step 2]

The micelle solution II was dropwise added to the micelle solution I. After the addition, the mixed liquid was kept stirred for 30 minutes.

[Step 3]

With stirring the mixed liquid obtained in the step 2, 1.5 mL of tetraethoxysilane was added to the mixed liquid. This was kept stirred as such for about 1 day.

[Step 4]

The solution obtained in the step 3 was set in a centrifuge and centrifuged. The precipitate formed in this treatment was collected. The collected precipitate was washed plural times with a mixed solution of chloroform and methanol.

[Step 5]

The precipitate obtained in the step 4 was dried, and then heated in an air atmosphere in a furnace at 1000° C. for 4 hours.

[Step 6]

The heat-treated powder obtained in the step 5 was stirred in an aqueous solution of 2 mol/L NaOH for 24 hours, thereby removing silica, if any, existing in the surface of the particles. Next, this was collected by filtration, washed with water and dried.

As a result of the above-mentioned steps 1 to 6, the intended sample was obtained. The obtained sample was analyzed through powdery X-ray diffractiometry (XRD; Rigaku's RINT2000 with a ray source of CuKα, at a voltage of 40 kV and a current of 30 mA), thereby giving a diffraction pattern shown in the second stage in FIG. 1. The peaks of this diffraction pattern correspond to those of the crystal structure of $\epsilon$-$Fe_2O_3$ shown in the top stage (orthorhombic, space group Pna2$_1$).

Figure 6:
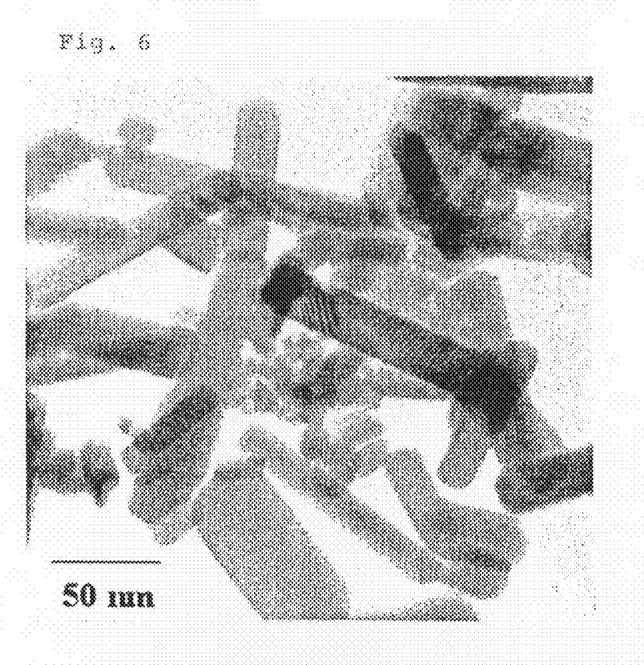
FIG. 6 is a TEM image of the Ga-containing ε-Fe$_2$O$_3$ particulate powder according to the invention, obtained in Example 1.

The obtained sample was further analyzed through fluorescent X-ray analysis (JEOL's JSX-3220), which confirmed that the product composition was $\epsilon$-$Ga_{0.22}Fe_{1.80}O_3$ though the starting composition was $\epsilon$-$Ga_{0.20}Fe_{1.80}O_3$. As a result of the measurement on the TEM (JEOL's JEM2000EXII) image, rod-shaped particles were identified, having a mean length of 54.3 nm, a width of 15.9 nm, and a mean particle volume, as computed through columnar approximation, of about 10776 nm$^3$. FIG. 6 shows the TEM image of the sample. The result in the measurement of the sample obtained in this Example, in cooling in a magnetic field, is shown in FIG. 2; and the magnetic hysteresis loop thereof is in FIG. 3. The spin reorientation temperature of the sample was 72K, the magnetic phase transition temperature was 490K, the coercive force (Hc) at room temperature (300K) was 15.3 kOe, and the saturation magnetization was 17.9 emu/g.

Example 2

This is an example of producing $\epsilon$-$Ga_{0.43}Fe_{1.57}O_3$.

The same process as in Example 1 was repeated, except that the amount of iron(III) nitrate 9-hydrate used in preparation of the micelle solution I was changed from 0.0180 mol/L to 0.0160 mol/L, and the amount of gallium(III) nitrate n-hydrate was from 0.0020 mol/L to 0.0040 mol/L. The starting composition was $\epsilon$-$Ga_{0.40}Fe_{1.60}O_3$.

The obtained sample was analyzed through powdery X-ray diffractiometry, thereby giving a diffraction pattern shown in the third stage in FIG. 1. The peaks of this diffraction pattern correspond to those of the crystal structure of $\epsilon$-$Fe_2O_3$ shown in the top stage (orthorhombic, space group Pna2$_1$).

Figure 7:
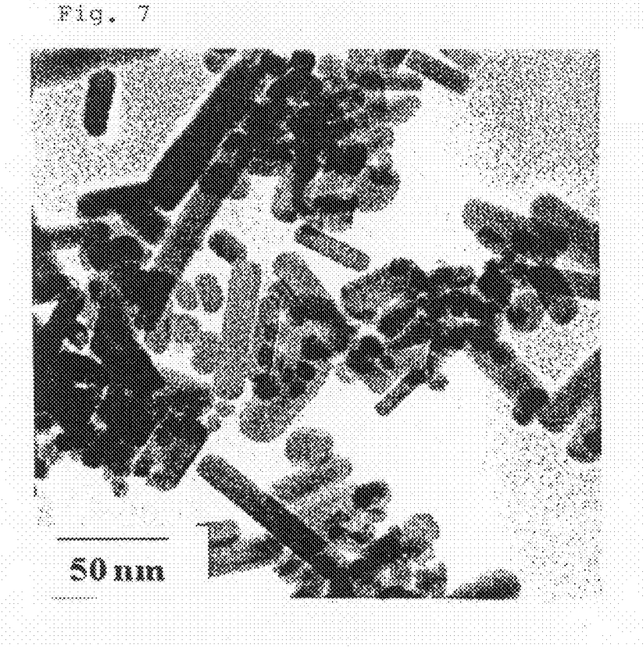
FIG. 7 is a TEM image of the Ga-containing ε-Fe$_2$O$_3$ particulate powder according to the invention, obtained in Example 2.

The obtained sample was further analyzed through fluorescent X-ray analysis, which confirmed that the product composition was $\epsilon$-$Ga_{0.43}Fe_{1.57}O_3$ though the starting composition was $\epsilon$-$Ga_{0.40}Fe_{1.60}O_3$. As a result of the measurement on the TEM image, rod-shaped particles were identified, having a mean length of 37.5 nm, a width of 12.0 nm, and a mean particle volume of about 4239 nm$^3$. FIG. 7 shows the TEM image of the sample. The result in the measurement of the sample obtained in this Example, in cooling in a magnetic field, is shown in FIG. 2; and the magnetic hysteresis loop thereof is in FIG. 3. The spin reorientation temperature of the sample was not found, the magnetic phase transition temperature was 476K, the coercive force (Hc) at room temperature was 10.7 kOe, and the saturation magnetization was 19.7 emu/g.

Example 3

This is an example of producing $\epsilon\text{-}Ga_{0.62}Fe_{1.38}O_3$.

The same process as in Example 1 was repeated, except that the amount of iron(III) nitrate 9-hydrate used in preparation of the micelle solution I was changed from 0.0180 mol/L to 0.0140 mol/L, and the amount of gallium(III) nitrate n-hydrate was from 0.0020 mol/L to 0.0060 mol/L. The starting composition was $\epsilon\text{-}Ga_{0.60}Fe_{1.40}O_3$.

The obtained sample was analyzed through powdery X-ray diffractiometry, thereby giving a diffraction pattern shown in the fourth stage in FIG. 1. The peaks of this diffraction pattern correspond to those of the crystal structure of $\epsilon\text{-}Fe_2O_3$ shown in the top stage (orthorhombic, space group $Pna2_1$).

Figure 8:
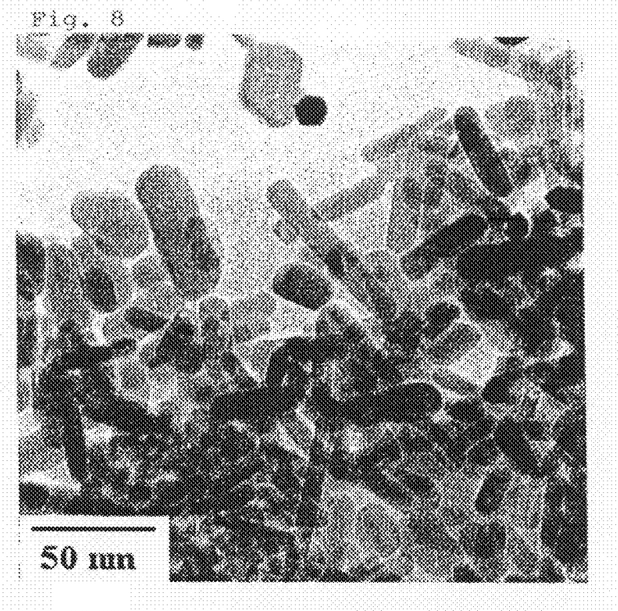
FIG. 8 is a TEM image of the Ga-containing ε-Fe$_2$O$_3$ particulate powder according to the invention, obtained in Example 3.

The obtained sample was further analyzed through fluorescent X-ray analysis, which confirmed that the product composition was $\epsilon\text{-}Ga_{0.62}Fe_{1.38}O_3$ though the starting composition was $\epsilon\text{-}Ga_{0.60}Fe_{1.40}O_3$. As a result of the measurement on the TEM image, rod-shaped particles were identified, having a mean length of 25.8 nm, a width of 10.7 nm, and a mean particle volume of about 2319 nm³. FIG. 8 shows the TEM image of the sample. The result in the measurement of the sample obtained in this Example, in cooling in a magnetic field, is shown in FIG. 2; and the magnetic hysteresis loop thereof is in FIG. 3. The spin reorientation temperature of the sample was not found, the magnetic phase transition temperature was 437K, the coercive force (Hc) at room temperature was 6.5 kOe, and the saturation magnetization was 20.4 emu/g.

Example 4

This is an example of producing $\epsilon\text{-}Ga_{0.80}Fe_{1.20}O_3$.

The same process as in Example 1 was repeated, except that the amount of iron(III) nitrate 9-hydrate used in preparation of the micelle solution I was changed from 0.0180 mol/L to 0.0120 mol/L, and the amount of gallium(III) nitrate n-hydrate was from 0.0020 mol/L to 0.008 mol/L. The obtained sample was analyzed through powdery X-ray diffractiometry, thereby giving a diffraction pattern shown in the fifth stage in FIG. 1. The peaks of this diffraction pattern correspond to those of the crystal structure of $\epsilon\text{-}Fe_2O_3$ shown in the top stage (orthorhombic, space group $Pna2_1$). The obtained sample was further analyzed through fluorescent X-ray analysis, which confirmed that the product composition was $\epsilon\text{-}Ga_{0.80}Fe_{1.20}O_3$ like the starting composition $\epsilon\text{-}Ga_{0.80}Fe_{1.20}O_3$. As a result of the measurement on the TEM image, rod-shaped particles were identified, having a mean length of 30.9 nm, a width of 10.7 nm, and a mean particle volume of about 2777 nm³. FIG. 9 shows the TEM image of the sample. The result in the measurement of the sample obtained in this Example, in cooling in a magnetic field, is shown in FIG. 2; and the magnetic hysteresis loop thereof is in FIG. 3. The magnetic phase transition temperature of the sample was 360K, the coercive force (Hc) at room temperature was 1.3 kOe, and the saturation magnetization was 14.5 emu/g.

Example 5

This is an example of producing $\epsilon\text{-}Ga_{0.97}Fe_{1.03}O_3$.

The same process as in Example 1 was repeated, except that the amount of iron(III) nitrate 9-hydrate used in preparation of the micelle solution I was changed from 0.0180 mol/L to 0.0100 mol/L, and the amount of gallium(III) nitrate n-hydrate was from 0.0020 mol/L to 0.0100 mol/L.

The obtained sample was analyzed through powdery X-ray diffractiometry, thereby giving a diffraction pattern shown in the sixth stage in FIG. 1. The peaks of this diffraction pattern correspond to those of the crystal structure of $\epsilon\text{-}Fe_2O_3$ shown in the top stage (orthorhombic, space group $Pna2_1$). The obtained sample was further analyzed through fluorescent X-ray analysis, which confirmed the product composition of $\epsilon\text{-}Ga_{0.97}Fe_{1.03}O_3$. On the TEM image of the sample, rod-shaped particles were identified, having a mean length of 57.9 nm, a width of 20.8 nm, and a mean particle volume of about 19664 nm³. FIG. 10 shows the TEM image. The result in the measurement of the sample obtained in this Example, in cooling in a magnetic field, is shown in FIG. 2; and the magnetic hysteresis loop thereof is in FIG. 3. The magnetic phase transition temperature of the sample was 280K, the coercive force (Hc) at room temperature was 0 kOe, and the saturation magnetization was 4.7 emu/g.

Control Example

This is an example of producing $\epsilon\text{-}Fe_2O_3$.

The same process as in Example 1 was repeated, except that the amount of iron(III) nitrate 9-hydrate used in preparation of the micelle solution I was 0.02 mol/L, and gallium (III) nitrate n-hydrate was not added.

The obtained sample was analyzed through powdery X-ray diffractiometry, thereby giving a diffraction pattern shown in the top stage in FIG. 1. As a result of computation of the lattice constant, axis a=5.10 angstroms, axis b=8.81 angstroms, axis c=9.47 angstroms.

The obtained sample was analyzed through fluorescent X-ray analysis, which confirmed the product composition of $\epsilon\text{-}Fe_2O_3$. On the TEM image of the sample, rod-shaped particles were identified, having a mean length of 98.5 nm, a width of 31.4 nm, and a mean particle volume of about 76237 nm³. FIG. 11 shows the TEM image. The result in the measurement of the sample obtained in this Example, in cooling in a magnetic field, is shown in FIG. 2; and the magnetic hysteresis loop thereof is in FIG. 3. The spin reorientation temperature of the sample was 154K, the magnetic phase transition temperature was 495K, the coercive force (Hc) at room temperature was 19.0 kOe, and the saturation magnetization was 15.4 emu/g.

FIG. 4 shows the coercive force of the samples obtained in these Examples, as arranged on the basis of the degree of Ga substitution, the value x. From FIG. 4, it is known that the coercive force uniformly lowers with the increase in the degree of Ga substitution. FIG. 5 shows the saturation magnetization of the samples obtained in these Examples, as arranged on the basis of the degree of Ga substitution, the value x. From FIG. 5, it is known that the saturation magnetization increases with the increase in the value x up to around 0.5, but when the value x increases more, the saturation magnetization lowers, and that, with the increase in the degree of Ga substitution, the saturation magnetization changes to have a maximum value.

Table 1 shows the degree of Ga substitution in the Ga-containing $Fe_2O_3$ obtained in the above-mentioned Examples, the spin reorientation temperature and the magnetic phase transition temperature of the samples. The spin reorientation temperature means the first inflection point at which the saturation magnetization began to lower while the temperature was lowered, as in the graph on the top stage, the leftmost side in FIG. 2. The magnetic phase transition temperature is as in the graph on the bottom stage, the center in FIG. 2. Briefly, the linear part of the graph while the temperature was lowered was extrapolated, and the temperature at the point at which the extrapolated linear line crosses 0 emu/g means the magnetic phase transition temperature.

TABLE 1

| Product | Magnetic Phase Transition Temperature (K) | Spin Reorientation Temperature (K) |
|---|---|---|
| $\epsilon\text{-Fe}_2\text{O}_3$ | 495 | 154 |
| $\epsilon\text{-Ga}_{0.22}\text{Fe}_{1.78}\text{O}_3$ | 490 | 72 |
| $\epsilon\text{-Ga}_{0.43}\text{Fe}_{1.57}\text{O}_3$ | 465 | — |
| $\epsilon\text{-Ga}_{0.62}\text{Fe}_{1.38}\text{O}_3$ | 410 | — |
| $\epsilon\text{-Ga}_{0.80}\text{Fe}_{1.20}\text{O}_3$ | 360 | — |
| $\epsilon\text{-Ga}_{0.97}\text{Fe}_{1.03}\text{O}_3$ | 280 | — |

The invention claimed is:

1. A magnetic material comprising a crystal of $\epsilon\text{-Ga}_x\text{Fe}_{2-x}\text{O}_3$ (wherein $0<x<1$) prepared by substituting a part of $Fe^{3+}$ ion sites of an $\epsilon\text{-Fe}_2\text{O}_3$ crystal with $Ga^{3+}$ ions and having X-ray diffraction peaks corresponding to the crystal structure of $\epsilon\text{-Fe}_2\text{O}_3$.

2. The magnetic material as claimed in claim 1, which has a relation that its coercive force lowers with the increase in the value x.

3. The magnetic material as claimed in claim 1, which comprises fine particles having a single domain structure.

4. The magnetic material as claimed in claim 1, which comprises fine particles having a mean particle volume of at most 20000 $nm^3$ as measured on the TEM image thereof.

5. A magnetic layer of a magnetic recording medium, which comprises a powder of the magnetic material of claim 1 comprising fine particles having a mean particle volume of at most 20000 $nm^3$ as measured on the TEM image thereof, and in which the magnetization easy axis of each particle crystal is oriented in a predetermined direction and the position of the individual particles is fixed.

6. The magnetic layer as claimed in claim 5, wherein the particle surface of the powder is coated with a thin film of a non-magnetic compound.

7. The magnetic layer as claimed in claim 5, wherein the powder comprises magnetic particles having a single domain structure.

8. The magnetic layer as claimed in claim 5, wherein the powder has a coercive force of from 1000 to 10000 Oe.

* * * * *